April 30, 1940.   E. A. ARNDT   2,199,234
BRAKING MECHANISM FOR WIND DRIVEN GENERATORS
Filed Dec. 24, 1937
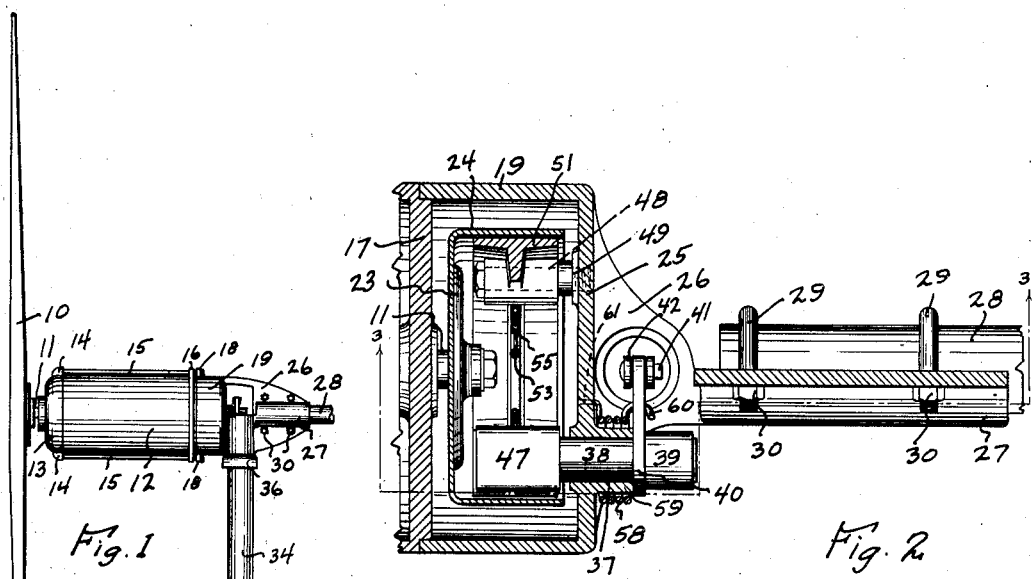
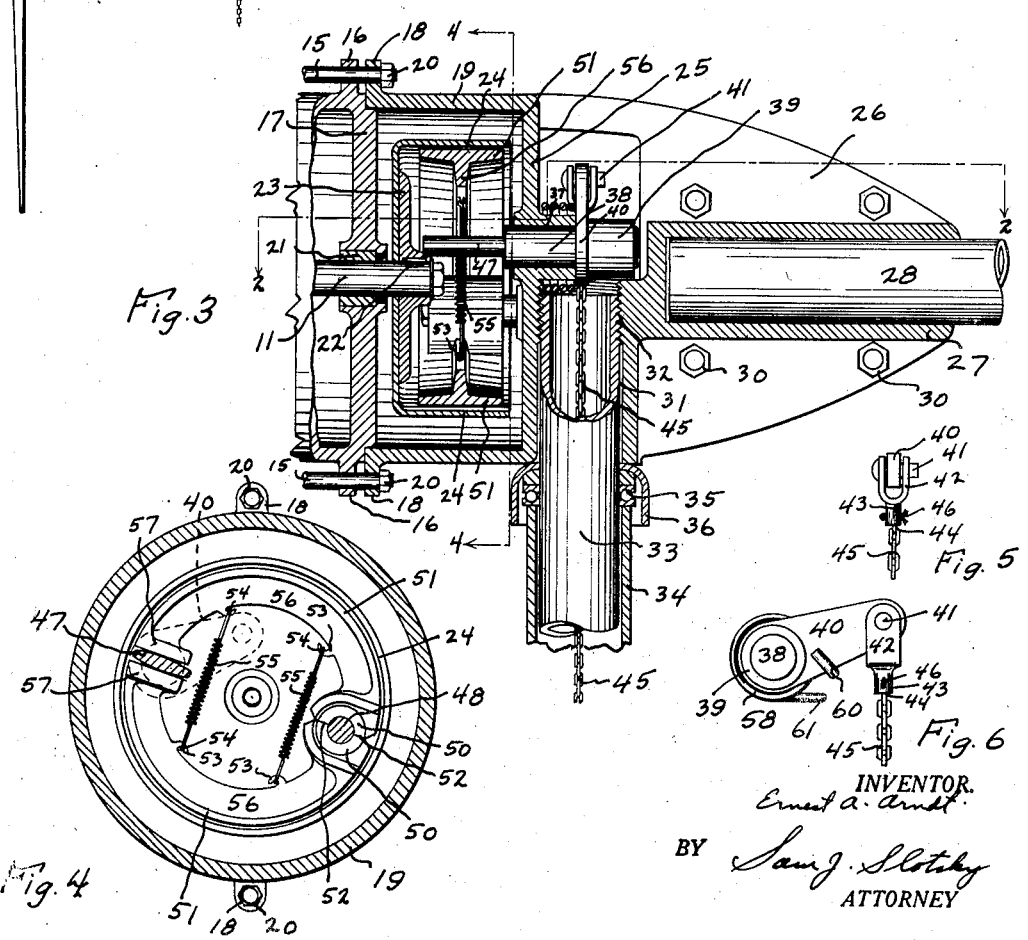
INVENTOR.
Ernest A. Arndt.
BY Sam J. Slotky
ATTORNEY Patented Apr. 30, 1940

2,199,234

UNITED STATES PATENT OFFICE 2,199,234

BRAKING MECHANISM FOR WIND DRIVEN GENERATORS

Ernest A. Arndt, Sioux City, Iowa, assignor to Wincharger Corporation, Sioux City, Iowa, a corporation of Minnesota Application December 24, 1937, Serial No. 181,683

3 Claims. (Cl. 188—1)

My invention relates to a device usable with wind driven generators.

An object of my invention is to provide a braking device usable with such generators which is completely enclosed.

A further object of my invention is to provide a braking mechanism which performs the braking action with a minimum amount of effort.

A further object of my invention is to provide an internal braking device which can be readily incorporated with the rear plate of a wind driven generator.

A further object of my invention is to provide such a brake which is completely enclosed at all times and which can be manufactured at a reasonable cost.

With these and other objects in view, my invention consists in the construction, arrangement and combination of the various parts of my device, whereby the objects contemplated are attained, as hereinafter more fully set forth, pointed out in my claims, and illustrated in the accompanying drawing, in which Figure 1 is a side elevation of a wind driven generator, Figure 2 is a sectional view taken substantially along the lines 2—2 of Figure 3, Figure 3 is a sectional view taken substantially along the lines 3—3 of Figure 2.

Figure 4 is a sectional view taken along the lines 4—4 of Figure 3.

Figure 5 is a detail of the control link attachment, and

Figure 6 is a further detail of the control link.

I have used the character 10 to designate the wind blades of a wind driven generator which is attached to the shaft 11 of the generator 12. The forward plate 13 of the generator includes a pair of bosses 14 into which are threadably received lengthened bolts 15. The bolts 15 pass through further lugs 16 which are attached adjacent the rear plate 17 of the generator. The bolts 15 pass through further ears 18 which are attached to the hollow casting 19 and the nuts 20 engage the end of such bolts to clamp the casting 19 and the plate 13 in fixed rigid relation.

The rear plate 17 includes the bearing 21 in which the other end of the shaft 11 is journalled. The shaft 11 is keyed at 22 to a further circular plate 23 which is suitably attached to the cylindrical brake drum 24. The casting 19 terminates in the end wall 25 which merges into a ribbed structure 26 which in turn includes the hollow portion 27 adapted to receive a tail vane bearing pipe 28 which in turn is clamped within the portion 27 by means of U bolts 29 which are secured by means of the nuts 30, such tail vane structure not being shown herein since it is not essential to the spirit of the invention.

Merging adjacently to the wall 25 is the vertical cylindrical opening 31 which includes the upper threads 32. Threadably engaged with the threads 32 is the hollow vertical pipe 33 which is tightly screwed therein and which can be further secured by means of a further lock screw etc. The pipe 33 is received within a further outer pipe or tube 34 upon which rests the thrust bearing 35 which is enclosed by means of the cup member 36. The wall 25 further includes the opening 37 in which is journalled the shaft 38 to which is securely fixed the member 39 which terminates in the link 40. Pivotally attached at 41 to the end of the link 40 is the clevice 42 which terminates in the portion 43 into which is received at 44 the chain 45. The chain 45 is suitably affixed by means of the cotter key 46 and the chain 45 passes downwardly through the pipe 33 to the ground below, it being understood that the arrangement is pivotally mounted upon a suitable tower. The shaft 38 extends into the integral cam 47 which is of a lengthened oval shape in cross section as shown more clearly in Figures 2 and 4. A pin 48 is securely attached at 49 to the wall 25. Journalled upon the pin 48 are the two semicircular portions 50 which are integral continuations of the two semicylindrical brake shoe members 51, such brake shoe members being split along the surfaces 52 adjacent the pin. The shoe members 51 include the hook portions 53 at opposite points to which are attached the ends 54 of the springs 55 which springs normally spring urge the shoe members toward each other and against the cam 47. The hooks 53 are integral formations formed from the central ribs 56 which merge with the brakeshoe members 51.

It will now be seen from the foregoing structure that during rotation of the generator shaft 11 the brake drum 24 will rotate with the shaft. When the chain 45 is pulled from below and suitably attached, the cam 47 which is positioned between the end flanges 57 of the shoes 51, will rotate due to the pivotal movement imparted to the shaft 38 through the link 40. The rotation of the cam will spread the members 57 apart thereby also spreading the shoe members 51 in the same manner and the engagement of the shoe members 51 with the drum 24 will efficiently brake the shaft 11 so that the generator will cease its rotation. This feature is provided to prevent overcharging of the batteries attached to the generator so that by a simple manipulation the wind driven generator can be locked against such rotation and can be retained in inoperative position.

A torsion spring 58 is received about the bearing 59 and the torsion spring 58 includes a looped end portion 60 adapted to receive the link 40 (see Figures 2 and 6). The other extremity 61 of the torsion spring is received within a suitable cavity in the plate 25 and in this manner the link 40 is normally spring urged back to inoperative position when the chain 45 is released.

It will now be seen that I have provided a braking device for wind driven generators which is completely enclosed, which performs the braking action with a minimum amount of effort, which is provided in an internal structure, which can be incorporated directly with the rear of such a generator, which by virtue of its internal structure is completely enclosed at all times eliminating exposure to the elements etc., and which can be manufactured at a reasonable cost.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A braking mechanism for generators comprising a generator including a rearwardly extending enclosed casing extending beyond the generator rear bearings, braking means within said casing, a hollow pivotal member attached to said casing rearwardly of said casing, means operating said braking means positioned within said pivotal member.

2. A braking mechanism for generators comprising a generator including a rearwardly extending enclosed casing extending beyond the generator rear bearings, braking means within said casing, a hollow pivotal member attached to said casing rearwardly of said casing, means operating said braking means positioned within said pivotal member, said braking means including a brake drum attached to the generator shaft, a pair of brake shoes within the drum, means for expanding said brake shoes against said drum, including a cam member positioned therebetween, means for rotating said cam member including a lever attached to the cam, means for controlling said lever extending through said pivotal member.

3. A braking mechanism for generators comprising a generator including a rearwardly extending enclosed casing extending beyond the generator rear bearings, braking means within said casing a hollow pivotal member attached to said casing rearwardly of said casing, means operating said braking means positioned within said pivotal member, said housing including a rear tail vane supporting structure attached thereto.

ERNEST A. ARNDT.